United States Patent
Gautschi

(10) Patent No.: US 10,387,886 B2
(45) Date of Patent: Aug. 20, 2019

(54) SECURE TRANSACTION PROCESSING IN A COMMUNICATION SYSTEM

(71) Applicant: Peter Gautschi, Lauperswil (CH)

(72) Inventor: Peter Gautschi, Lauperswil (CH)

( * ) Notice: Subject to any disclaimer, the term of this patent is extended or adjusted under 35 U.S.C. 154(b) by 550 days.

(21) Appl. No.: 15/117,530

(22) PCT Filed: Feb. 11, 2015

(86) PCT No.: PCT/IB2015/051017
§ 371 (c)(1),
(2) Date: Aug. 9, 2016

(87) PCT Pub. No.: WO2015/121801
PCT Pub. Date: Aug. 20, 2015

(65) Prior Publication Data
US 2016/0342998 A1    Nov. 24, 2016

(30) Foreign Application Priority Data

Feb. 11, 2014 (EP) .................................... 14154757

(51) Int. Cl.
*G06Q 20/20* (2012.01)
*G06Q 20/32* (2012.01)
*G06Q 20/42* (2012.01)
*G06Q 20/40* (2012.01)

(52) U.S. Cl.
CPC .......... *G06Q 20/425* (2013.01); *G06Q 20/20* (2013.01); *G06Q 20/3276* (2013.01); *G06Q 20/3278* (2013.01); *G06Q 20/401* (2013.01)

(58) Field of Classification Search
CPC .................................................... G06Q 20/425
USPC ...................................... 235/379; 705/39, 44
See application file for complete search history.

(56) References Cited

FOREIGN PATENT DOCUMENTS

| | | |
|---|---|---|
| EP | 2575096 A1 | 4/2013 |
| EP | 2631860 A1 | 8/2013 |
| EP | 2688026 A1 | 1/2014 |
| WO | 2013/048322 A1 | 4/2013 |

*Primary Examiner* — Allyson N Trail
(74) *Attorney, Agent, or Firm* — Mu P.C.

(57) ABSTRACT

The present invention concerns a method of processing a transaction between a payee and a payor, in a communication system comprising a payor service provider server ($3_2$), a payee service provider server ($3_1$) and a portable wireless communication device (2) operable by the payor. The method comprises: the payor service provider server ($3_2$) receiving (19) a transaction identifier and a payee service provider identifier from the portable wireless communication device (2); the payor service provider server ($3_2$) requesting (21) transaction information from the payee service provider server ($3_1$) identified by the payee service provider identifier; the payor service provider server ($3_2$) receiving (23) the requested transaction information; the payor service provider server ($3_2$) transmitting (27) the transaction information to the portable wireless communication device (2); and the payor service provider server ($3_2$) receiving (29) a transaction confirmation request from the portable wireless communication device (2).

15 Claims, 2 Drawing Sheets

SECURE TRANSACTION PROCESSING IN A COMMUNICATION SYSTEM

TECHNICAL FIELD

The invention relates to a method of processing transactions in a communication system. The invention also relates to a communication element arranged to execute the method, to a computer program product for the communication element, and to the communication system comprising the communication element.

BACKGROUND OF THE INVENTION

Credit cards, debit cards, prepaid cards and membership cards have become a widespread means of cashless payment. However, there is the danger of a fraudulent use of these payment cards and it is very troublesome for both the customer and the issuer of the card to ensure that the card cannot be misused.

The use of payment cards also bears the problem that personal data of the card holder and especially security elements, such as passwords, have to be transferred to a payment terminal of the payee. In state of the art payment systems as used, for instance, in supermarkets and various shops, personal data, such as the bank account number/payment card number, the bank code number, the name and address of the customer etc, may be read from the payment card and be transferred to the reading device of the owner of a shop. The transferred personal data may be used by the shop owner for initiating a payment transaction by sending a corresponding request to a server of the financial service provider. The transfer of personal data from a customer's payment card to the terminal of the payee is a security risk.

To overcome the problems related to the direct use of payment cards, some payment solutions using a customer terminal, such as a mobile phone, have been proposed. In some of these solutions, also known as mobile payment solutions, a customer terminal scans a bar code at the point of sale (POS) to initiate a payment transaction. However, many of these solutions have some flaws related to the processing of the transaction, and related especially to the security and anonymity of the transaction. These known solutions expose the payor to untrusted network elements and require the payor to send confidential information to untrusted network elements. This is of course a security risk and should therefore be minimised.

It is the object of the present invention to overcome the problems related to current transaction processing methods by providing a more sophisticated transaction processing solution that can be applied not only in shops, but for example for online transactions or at automated teller machines (ATMs).

SUMMARY OF THE INVENTION

According to a first aspect of the invention, there is provided a method of processing a transaction as recited in claim 1.

The proposed new solution has the advantage that the transaction processing can be carried out quickly, securely and anonymously. In the present method, the second transaction party does not exchange any confidential information, such as payor details, with the first transaction party. The second transaction party, having obtained the transaction identifier and the payee service provider identifier from the first transaction party, only deals with his own trusted service provider. The latter may have further secured and trusted connections, for example with various financial institutions. The second service provider server can reliably identify the second transaction party and thus ensure that the second transaction party is indeed who he or she purports to be. This can be achieved by conventional identification steps performed by the second transaction party, such as entering passwords etc. Furthermore, in the present invention, communication elements only communicate with other communication devices with which a trust relationship has already been established.

The transaction processing may also be anonymous, since the first transaction party does not need to know at any stage of the transaction the identity of the second transaction party. A confirmation may be sent to the first transaction party (and optionally to the second transaction party) that a transaction has been successfully completed, but in most applications the details of the second transaction party would not need to be transmitted to the first transaction party.

According to a second aspect of the invention, there is provided a server for performing the transaction processing method according to the first aspect.

According to a third aspect of the invention, there is provided a computer program product arranged to execute the method according to the first aspect of the present invention.

According to a fourth aspect of the present invention, there is provided a communication system comprising the server according to the second aspect of the present invention.

Other aspects of the invention are recited in the dependent claims attached hereto.

BRIEF DESCRIPTION OF THE DRAWINGS

Other features and advantages of the invention will become apparent from the following description of a non-limiting exemplary embodiment, with reference to the appended drawings, in which.

DETAILED DESCRIPTION OF AN EMBODIMENT OF THE INVENTION

Figure 1:
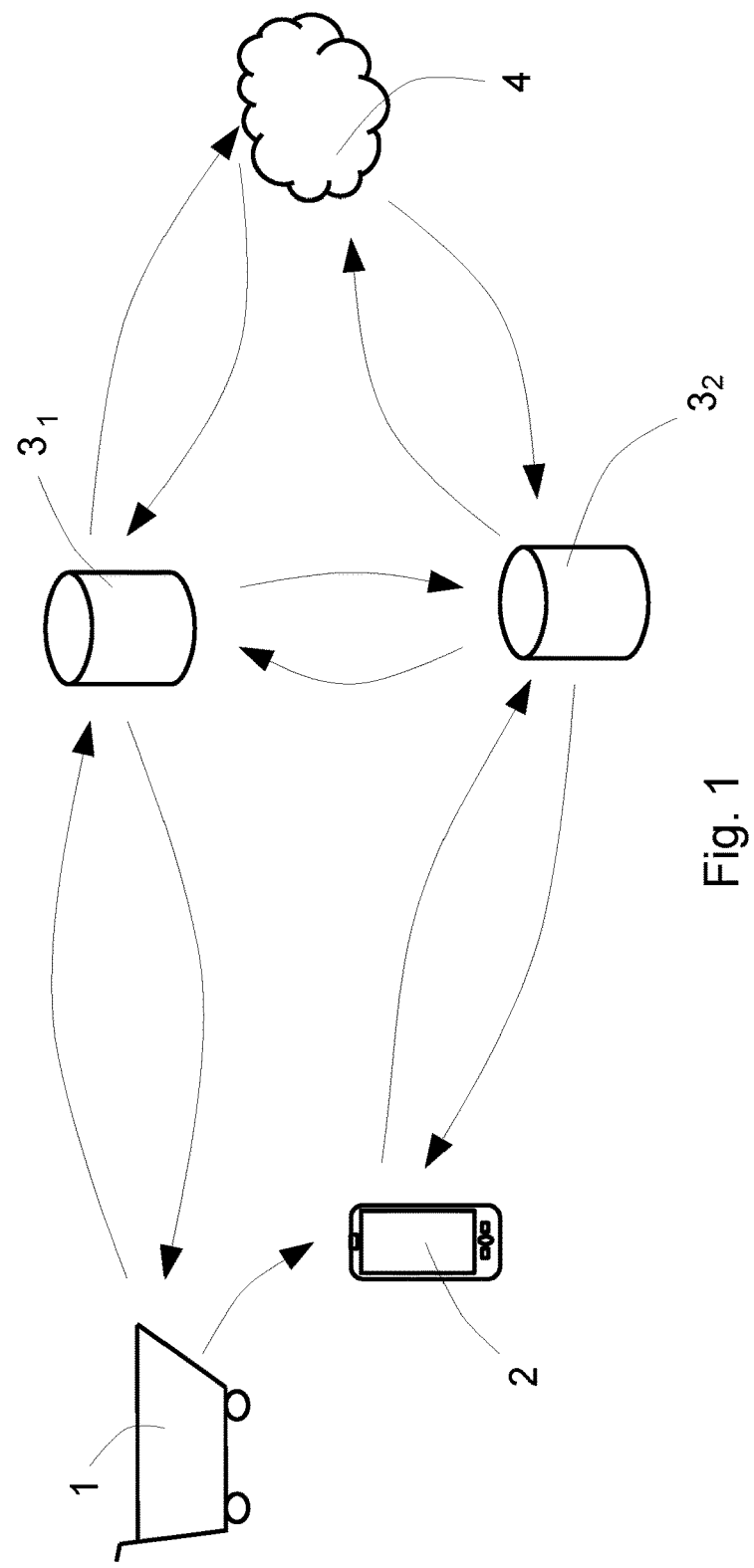
FIG. 1 illustrates some of the communication network elements of the communication system where the method according to the present invention can be carried out.

An embodiment of the present invention will be described below in more detail with reference to the attached figures. Identical or corresponding functional and structural elements which appear in the different drawings are assigned the same reference numerals.

FIG. 1 illustrates an example of a simplified communication network diagram showing the elements which are useful for understanding the teachings of the present invention. This exemplary diagram shows five network elements, namely a payee or POS terminal 1, a payor-, customer- or user-operable mobile device 2, a first service provider server, also referred to as a payee or POS server $3_1$, a second service provider server, also referred to as a payor's or user's service provider server $3_2$ and a banking network 4 comprising network elements of different financial institutions, such as banks or credit card companies, for example. These banking network elements, such as servers, are for instance capable of debiting customers' accounts or credit cards upon receiving an approval from a customer to credit a payee's account. The POS server $3_1$ is a network element of a service provider of a first transaction party, sometimes the payee, while the user's service provider server $3_2$ is a network element of a service provider of a second transaction party, sometimes the payor or user. The service providers can be e.g. telecommunication operators or providers offering payment applications or solutions.

In the present invention, the first transaction party can connect to the trusted first service provider server $3_1$ with which he or she has established a first trust relationship, while the second transaction party can connect to the trusted second service provider server $3_2$ with which he or she has established a second trust relationship. There may thus be a secure communication link between the first service provider server $3_1$ and a device operable by a first transaction party (e.g. a payee's POS terminal) on one hand, and between the second service provider server $3_2$ and a device operable by a second transaction party (e.g. a user's mobile phone) on the other hand. Encrypted communications may be used to obtain these secured communication links.

As shown in FIG. 1, at least one of the servers $3_1$, $3_2$ may also be connected to the banking network 4. This connection can be either a wired or wireless or optical connection. The POS server $3_1$ is also able to communicate with the POS terminal 1, while the user's service provider server $3_2$ is able to communicate with the mobile device 2. Again, these communication links can be either wired or wireless or optical connections. However, there is a wireless connection between the mobile device 2 and the user's service provider server $3_2$.

In the example described below, the terminal 1 is a POS terminal, but it could alternatively be any other unit arranged to convey certain information either actively or passively to the mobile device 2. Accordingly, depending on the application where the teachings of the invention are applied, the terminal 1 could be an ATM, a display showing a website, a poster, a label, a ticket, a portable wireless handheld device etc.

The mobile devices 2 are digital communication devices, such as mobile phones (e.g. smart phones), laptops, tablets etc, having the capability to communicate with service providers preferably wirelessly. The mobile devices 2 are also arranged to receive information from the POS terminal 1 and preferably not to send any payor-identifying information to the POS terminal 1.

The mobile devices 2 can receive the information optically, acoustically, by using a near field communication method etc. If the information is received optically, then the POS terminal 1 may for example display a barcode that the mobile device 2 can scan. A barcode is a machine-readable optical label that contains information about the item to which it is attached or associated. The barcode may be a one-dimensional barcode or a two-dimensional barcode, also known as a matrix barcode. If a two-dimensional barcode is used in the present invention, then this barcode may be for instance a quick Response™ (QR) code. A QR code generally consists of black modules (square dots) arranged in a square grid on a white background, which can be read by an imaging device (such as a camera) and processed using Reed Solomon error correction until the image can be appropriately interpreted. Data may then be extracted from patterns present in both horizontal and vertical components of the image.

Figure 2:
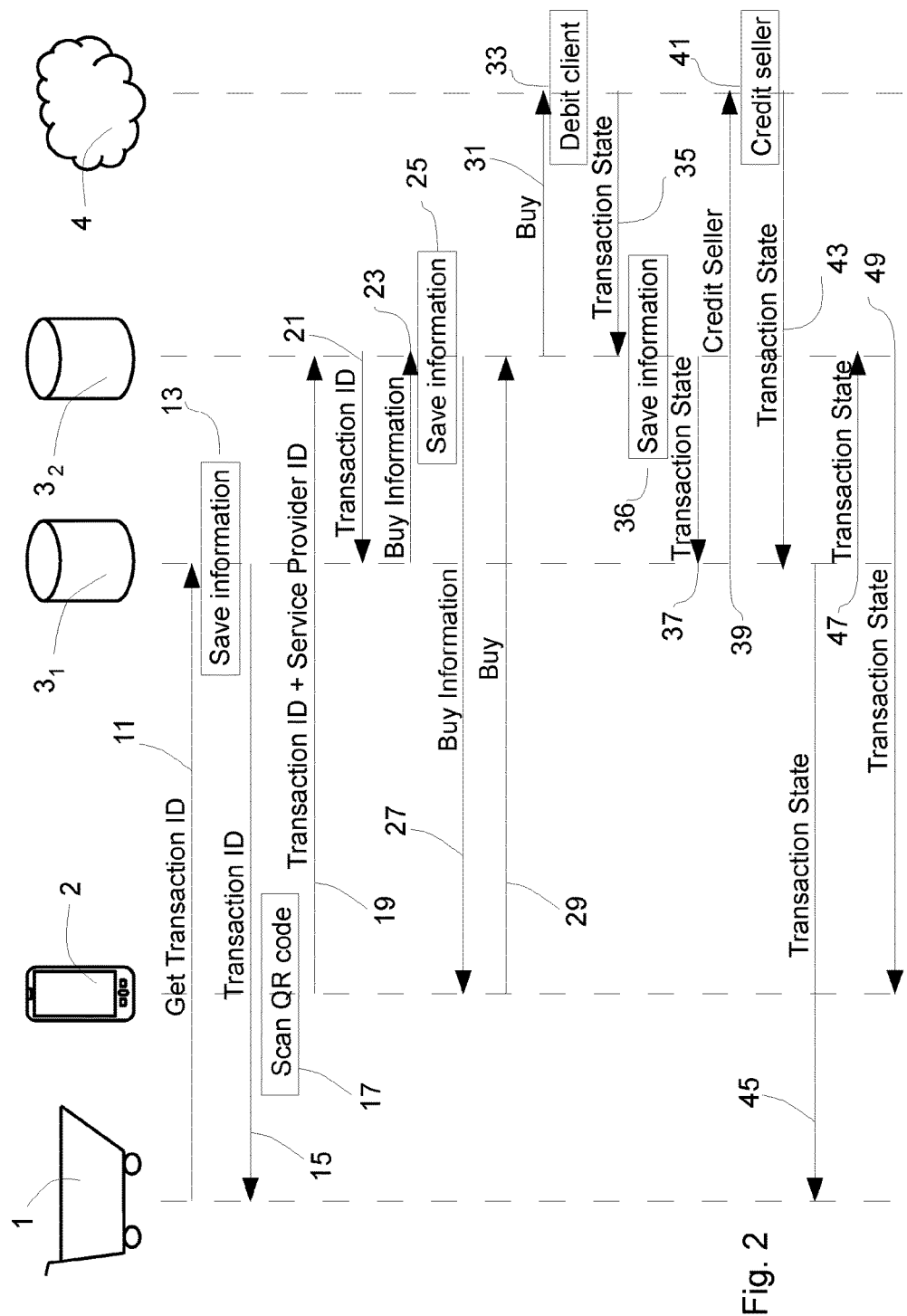
FIG. 2 is a flow chart illustrating the secure transaction processing method according to one exemplary embodiment.

The flow chart of FIG. 2 illustrates the steps taken and the various messages sent between different entities involved in the process to carry out a secured payment transaction according to one embodiment of the present invention. Once the payee has chosen to use the present transaction processing method to allow the user or payor to pay his purchases, then in step 11 the POS terminal sends a request to get a transaction ID to the POS server $3_1$. This message can also contain a service provider identifier of the POS and some information related to the future transaction. This information may contain for example an identity of the entity offering the transaction (a company name for instance), contact details of that entity, the amount of the transaction, the currency, warranty information, terms and conditions, and/or a description of the product or service which is the subject of the transaction etc. In this particular example this message contains the following information:

Service provider ID: 01AB-1234-AF12-09AB,
Amount: 150,
Currency: CHF,
Product description: Book: "The Art of Fly Fishing".

Once the POS server $3_1$ has received this information, in step 13 it saves it and generates a transaction ID. This transaction ID in combination with the service provider ID is preferably unique in the whole world. In this example the service provider with the ID 01AB-1234-AF12-09AB has now the following information saved in its database:

Transaction ID: FAC4-ABCC-AFFA-0901,
Amount: 150,
Currency: CHF,
Product description: Book: "The Art of Fly Fishing".

Then in step 15 the POS server $3_1$ sends the transaction ID to the POS terminal 1. Now the user of the mobile device 2 wants to buy the product or service offered on sale by the payee. In this example, a QR code is displayed by the POS terminal 1 on a pin-pad. This QR code contains in this example the transaction ID and the service provider ID of the POS terminal 1, the latter however is not needed if there is only one service provider. Then in step 17 the mobile device 2 scans the QR code and thereby optically reads the information contained in the QR code. In this example it extracts the transaction ID and the service provider ID. The mobile device 2 receives no further information from the POS terminal 1.

Next in step 19 the mobile device 2 sends the transaction ID together with the service provider ID extracted from the QR code to the service provider of that particular user and thus requests to receive information related to the transaction he is willing to accept. In this example the following is sent to the user's service provider server $3_2$:

Transaction ID: FAC4-ABCC-AFFA-0901,
Service provider ID: 01AB-1234-AF12-09AB.

In this example, since the user's service provider is not the same as the service provider of the POS, the user's service provider server $3_2$ forwards in step 21 the request including the transaction ID to the service provider of the POS. The user's service provider server $3_2$ knows which service provider it should contact because it received the service provider ID in step 19.

In response to the request received in step 21, the POS server $3_1$ sends the information related to the transaction in step 23 to the user's service provider server $3_2$. This information contains the data sent to the POS server $3_1$ in step 11. In this example the following information is received by the user's service provider server $3_2$:

Transaction ID: FAC4-ABCC-AFFA-0901,
Service provider ID: 01AB-1234-AF12-09AB,
Amount: 150,
Currency: CHF,
Product description: Book: "The Art of Fly Fishing".

Now in step 25 the user's service provider server $3_2$ saves the information received so that it can be used later. Next in step 27 the user's service provider server $3_2$ forwards this information to the mobile device 2. If the items or service are bought in foreign currency, then a valid exchange rate may also be sent to the mobile device 2. This exchange rate may also be sent to the POS server $3_1$ in step 15 to be shown to the payee. Now the mobile device 2 can display the received information so that the user can see the relevant information related to the transaction he is planning to accept. It is to be noted here that some information, such as the price for example, may already have been displayed in clear text to the user, for example in connection with the displaying of the QR code. In this example the following is thus shown to the user on the display of the mobile device 2:

Amount: 150,
Currency: CHF,
Product description: Book: "The Art of Fly Fishing".

Now the user can decide whether to proceed with the transaction or not. If the decision is in the affirmative, then in step 29 the mobile device 2 sends a transaction confirmation request to the user's service provider server $3_2$. This request can also define how the user would like to pay for the transaction. For instance, the user can define here whether a credit, debit, membership or prepaid card should be debited or if he wants to do a wire transfer in which case he may have to give his account ID etc. He may also have to enter his password. The necessity to give a password may depend on the amount of the transaction or on the guidelines or rules of the financial institutions. For example, if the amount is higher than a certain threshold, then a password is required so that the payment transaction can be pursued. In the application there can also be defined a default payment method, for instance a specific credit, debit, membership or prepaid card. In this case, if the user does not specify a payment method, it can be assumed that the user desires to use the default payment method, which is known by its service provider. In this example, the following is sent to the user's service provider server $3_2$:

Transaction ID: FAC4-ABCC-AFFA-0901,
Finance provider: Swiss Bank 001,
Password: ******,
Account ID: 1234 5678 9999 0 (in case of a bank account, IBAN is given).

Once the user's service provider server $3_2$ receives the transaction confirmation request, it determines the content of the request and in step 31 sends a payment transaction instruction, including at least the amount to be debited, to a financial institution according to the user's request. This institution can be e.g. a bank or credit card company according to the information contained in the user's transaction confirmation request of step 29. In step 33 the financial institution debits the user's account with an amount corresponding to the transaction amount. However, it is also possible that the transaction cannot be carried out, i.e. the user's account cannot be debited. This can happen for example if the user does not have sufficient funds on his account, or he has exceeded his credit card limit or he has exceeded his monthly or annual spending limit. In step 35 the financial institution sends a debit transaction state message back to the user's service provider server $3_2$. If the financial institution was able to debit the user's account, then the debit transaction state message will be a positive confirmation indicating the successful completion of the debit transaction, optionally also confirming the debited amount and/or how the amount was debited. In this example the following information may be sent from the financial institution to the user's service provider server $3_2$:

Transaction ID: FAC4-ABCC-AFFA-0901,
Status: OK.

In step 36 the user's service provider server $3_2$ updates its database accordingly, so that in this example the following may now be saved in its database:

Transaction ID: FAC4-ABCC-AFFA-0901,
Service provider ID: 01AB-1234-AF12-09AB,
Amount: 150,
Currency: CHF,
Product description: Book: "The Art of Fly Fishing"
Payor status: OK.

In step 37 the user's service provider server $3_2$ sends a debit transaction state message to the POS server $3_1$. Thanks to the information saved in step 25, the user's service provider server $3_2$ knows which POS server $3_1$ it should contact. Once the POS server $3_1$ has received the debit transaction state message, if it indicates that the amount was debited from the user, it can now in step 39 send to the financial institution of the payee a request to credit the payee's account. The financial institution of the payee, bank account details etc, have been previously communicated to the service provider of the payee. Next in step 41 the financial institution of the payee credits the payee's account with the amount of the transaction. In order for this to be possible, the financial institutions of the payee and the user may have to communicate with each other.

Next in step 43 a credit transaction state message is sent by the financial institution of the payee to the POS server $3_1$. If the crediting was successful, then the credit transaction state message confirms that the transaction was successful, otherwise a negative credit transaction status message is sent. Now in this example the POS server $3_1$ has the following information saved in its database:

Transaction ID: FAC4-ABCC-AFFA-0901,
Amount: 150,
Currency: CHF,
Product description: Book: "The Art of Fly Fishing",
Payor status: OK,
Account ID: CH01 0000 1234 1234 1234 5,
Payee status: OK.

After this, the POS server $3_1$ informs in step 45 the POS terminal 1 about the credit transaction state so that this entity can deliver the product or perform the service to the user. In step 47 the POS server $3_1$ informs the user's service provider server $3_2$ about the payment transaction state, which in turn informs the user about the payment transaction state in step 49. In this example the following information is thus saved in the database of the user's service provider server $3_2$ and also sent to the user:

Transaction ID: FAC4-ABCC-AFFA-0901,
Service provider ID: 01AB-1234-AF12-09AB,
Amount: 150,
Currency: CHF,
Product description: Book: "The Art of Fly Fishing",
Payor status: OK,
Payee status: OK.

It is also possible that the payee and/or user request the payment transaction state. The payee can request this information directly from the POS server $3_1$ while the user can request that information directly from the user's service provider server $3_2$. These requests include at least the transaction ID. Some other information, such as the identity of the POS, may also be sent. It is also possible for the payee to determine the payment transaction state by following its bank account transactions.

The above teachings can also be usefully implemented in applications other than a simple purchase transaction. For instance the terminal 1 may be an ATM. In this case the user would like to withdraw some cash from the ATM. Accordingly, the user first chooses the amount he would like to withdraw, as usual. However, according to the present invention, the ATM may then display a barcode, such as a QR code, to the user of the ATM. There may for example be one transaction ID allocated to every cash withdrawal. The cash withdrawal may follow the principles explained in connection with the description of the flow chart of FIG. 2. However, the user may be requested to confirm the withdrawal locally at the ATM, for instance by pressing a button or by using the input system of the ATM. According to this application the user does not need to enter a password or a personal identification number (PIN) by using the input system of the ATM. This therefore has the effect of reducing the possibility of fraud.

The teachings of the invention may also be applied to online shopping on the internet. In this case the barcode may be displayed by an internet browser. The user may also be required to enter a delivery address for the products that he or she is buying. The delivery address may be sent to the payee at any time during the transaction process. The process follows the principles of the flow chart of FIG. 2.

The teachings of the invention may also be applied to a situation in which the terminal 1 is a portable wireless communication device, such as a smart phone. In this application, the user of the portable device may be the payee, while the user of a second portable wireless communication device is the payor. The barcode comprising the transaction ID and the payee service provider ID may be thus displayed on the screen of the payee's device. Again, the process follows the principles described above in connection with the flow chart of FIG. 2.

The terminal 1 may simply be a poster showing a barcode, such as a QR code. In this case the same transaction ID could be used by several users. It may also be necessary to provide a delivery address to the payee for certain types of products being purchased. The principles of the above flow chart also apply in this particular application.

The present invention can also be applied at turnstiles, to be able to take a metro or a train, for example. In this application, a barcode may be shown at the turnstile, which only opens when a payment transaction has been successfully completed.

The teachings of the present invention also apply when the terminal 1 is a ticket, such a concert ticket, flight ticket, train ticket etc. In this case the barcode may be printed on the ticket and, once a successful transaction has been completed, the transaction completion status may be saved in a database to ensure that the ticket cannot be sold another time, and that the ticket can then be used to enter a corresponding event or transportation means.

It is also possible to apply the teachings of the present invention at petrol stations. In this case the user may choose a fixed amount of money, say 100 in a local currency, and if the user is not able to fill the amount of fuel corresponding to this amount, the remainder of the money may be reimbursed to the user's account. The reimbursement may happen automatically or by request. For instance, once the procedure of the flow chart of FIG. 2 has been completed, then the terminal 1 may contact user's service provider server $3_1$ to initiate the reimbursement process. In this situation, the two service providers involved may communicate with each other and with the relevant financial institutions to complete the reimbursement process. Again a confirmation of the state of the reimbursement transaction may be sent to the payee and/or to the payor to inform them of the result of the reimbursement transaction.

While the invention has been illustrated and described in detail in the drawings and foregoing description, such illustration and description are to be considered illustrative or exemplary and not restrictive, the invention being not limited to the disclosed embodiment. Other embodiments and variants are understood, and can be achieved by those skilled in the art when carrying out the claimed invention, based on a study of the drawings, the disclosure and the appended claims. For instance the proposed method may also be used to reserve a place or a product or service. The actual payment transaction may take place later, and not necessarily instantly. The proposed secure transaction processing method could also be used in these kinds of applications. It also possible that the POS server $3_1$ and the user's service provider server $3_2$ do not communicate directly between each other, but through another network element. In this case the POS server $3_1$ and the user's service provider server $3_2$ would both have a trusted communication with this other network element. However, in this situation the POS server $3_1$ and the user's service provider server $3_2$ do not have to establish a trusted communication between themselves.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used. Any reference signs in the claims should not be construed as limiting the scope of the invention.

I claim:

1. A method of processing a transaction between a first transaction party and a second transaction party, in a communication system comprising a first service provider server with which the first transaction party can communicate, and a second service provider server with which the second transaction party can establish a trusted communication by means of a portable wireless communication device, the method comprising:

the second service provider server receiving a transaction identifier and a first transaction party service provider identifier from the portable wireless communication device, the first transaction party service provider identifier identifying the first service provider server;

the second service provider server requesting transaction information from the first service provider server identified by the first transaction party service provider identifier;

the second service provider server receiving the requested transaction information;

the second service provider server transmitting the transaction information to the portable wireless communication device; and the second service provider server, in response to the transmitting of the transaction information, receiving a transaction confirmation request from the portable wireless communication device.

2. The method according to claim 1, wherein the communication system further comprises a banking network, and wherein, in response to the transaction confirmation request, the second service provider server issues a payment instruction to the banking network.

3. The method according to claim 1, wherein the communication system further comprises a transaction unit operable by the first transaction party, and wherein the method further comprises the first service provider server receiving a request to issue a transaction identifier from the transaction unit.

4. The method according to claim 3, wherein the first service provider server further receives the transaction information from the transaction unit.

5. The method according to claim 3, further comprising the first service provider server issuing the transaction identifier in response to the request received, and transmitting the transaction identifier to the transaction unit.

6. The method according to claim 1, wherein the communication system further comprises a transaction unit operable by the first transaction party, and wherein the method further comprises the portable wireless communication device receiving the transaction identifier and the first transaction party service provider identifier from the transaction unit.

7. The method according to claim 6, wherein the transaction identifier and the first transaction party service provider identifier are received by the portable wireless communication device scanning a bar code displayed by the transaction unit.

8. The method according to claim 1, further comprises the second service provider server receiving instructions how to pay the transaction from the portable wireless communication device.

9. The method according to claim 1, further comprising the second service provider server informing the portable wireless communication device about the status of the transaction.

10. The method according to claim 1, further comprising the second service provider server informing the first service provider server about the status of the transaction.

11. The method according to claim 1, wherein the transaction information comprises at least one of the following: a monetary amount of the transaction, currency, description of the subject of the transaction, identity of the payee, product or service warranty information and terms and conditions of the transaction.

12. The method according to claim 1, wherein the transaction identifier when taken in combination with the first transaction party service provider identifier is a worldwide unique identity.

13. A computer program product comprising instructions for implementing the steps of the method according to claim 1 when loaded and run on computer means of an electronic device.

14. A service provider server for processing a transaction between a first transaction party and a second transaction party, the service provider server being able to establish a trusted communication with a portable wireless communication device of the second transaction party, the service provider server being arranged to:
    receive a transaction identifier and a first transaction party service provider identifier from the portable wireless communication device, the first transaction party service provider identifier identifying a further service provide server, with which the first transaction party can communicate;
    request transaction information from the further service provider server identified by the first transaction party service provider identifier;
    receive the requested transaction information;
    transmit the transaction information to the portable wireless communication device; and
    receive, in response to the transmitting of the transaction information, a transaction confirmation request from the portable wireless communication device.

15. A communication system for processing a transaction between a first transaction party and a second transaction party, the communication system comprising a first service provider server, and further comprising further service provider server and a portable wireless communication device, the first transaction party being able to communicate with the first service provider server and the second transaction party being able to establish a trusted communication with the second service provider server by means of the portable communication device, the second service provider server being arranged to:
    receive a transaction identifier and a first transaction party service provider identifier from the portable wireless communication device, the first transaction party service provider identifier identifying the further service provide server;
    request transaction information from the further service provider server identified by the first transaction party service provider identifier;
    receive the requested transaction information;
    transmit the transaction information to the portable wireless communication device; and
    receive, in response to the transmitting of the transaction information, a transaction confirmation request from the portable wireless communication device.

* * * * *